US008088492B2

(12) United States Patent
Huynh

(10) Patent No.: US 8,088,492 B2
(45) Date of Patent: Jan. 3, 2012

(54) THERMAL TRANSFER IMAGE RECEIVING SHEET AND METHOD

(75) Inventor: Dieu Dai Huynh, Courcouronnes (FR)

(73) Assignee: Avery Dennison Corporation, Pasadena, CA (US)

( * ) Notice: Subject to any disclaimer, the term of this patent is extended or adjusted under 35 U.S.C. 154(b) by 1342 days.

(21) Appl. No.: 10/797,826

(22) Filed: Mar. 10, 2004

(65) Prior Publication Data

US 2005/0118360 A1 Jun. 2, 2005

Related U.S. Application Data

(60) Provisional application No. 60/454,258, filed on Mar. 13, 2003, provisional application No. 60/454,960, filed on Mar. 14, 2003.

(51) Int. Cl.

*B32B 27/00* (2006.01)
*B32B 27/40* (2006.01)
*C08G 18/08* (2006.01)

(52) U.S. Cl. .................. 428/423.1; 428/327; 428/423.7; 428/480; 428/500; 428/914; 524/591; 524/839; 524/840; 503/227

(58) Field of Classification Search .................. 428/327, 428/423.1, 480, 500, 914, 423.7; 503/227; 524/591, 839, 840

See application file for complete search history.

(56) References Cited

U.S. PATENT DOCUMENTS

| | | | | | |
|---|---|---|---|---|---|
| 3,479,310 | A * | 11/1969 | Bayer et al. | | 524/591 |
| 3,714,095 | A * | 1/1973 | Reischl et al. | | 524/591 |
| 4,578,285 | A | 3/1986 | Viola | | 427/209 |
| 4,599,293 | A * | 7/1986 | Eckell et al. | | 430/126 |
| 4,608,413 | A * | 8/1986 | Nachtkamp et al. | | 524/591 |
| 4,755,425 | A | 7/1988 | Huang | | 428/331 |
| 4,962,080 | A | 10/1990 | Watanabe | | 503/227 |
| 5,082,824 | A * | 1/1992 | Rhoades et al. | | 503/227 |
| 5,242,888 | A | 9/1993 | Atherton et al. | | 503/227 |
| 5,256,621 | A | 10/1993 | Yasuda et al. | | 503/227 |
| 5,258,353 | A | 11/1993 | MacDonald et al. | | 503/227 |
| 5,308,680 | A | 5/1994 | Desjarlais et al. | | 428/195 |
| 5,310,591 | A | 5/1994 | Dodge et al. | | 428/195 |
| 5,334,690 | A * | 8/1994 | Schafheutle et al. | | 528/71 |
| 5,407,724 | A | 4/1995 | Mimura et al. | | 428/141 |
| 5,409,882 | A | 4/1995 | Minato et al. | | 503/227 |
| 5,457,081 | A | 10/1995 | Takiguchi et al. | | 503/227 |
| 5,460,874 | A | 10/1995 | Rao | | 428/327 |
| 5,529,972 | A * | 6/1996 | Ramello et al. | | 503/227 |
| 5,658,847 | A | 8/1997 | Goss et al. | | 503/227 |

(Continued)

FOREIGN PATENT DOCUMENTS

EP 1 245 402 A2 10/2002

(Continued)

OTHER PUBLICATIONS

Results of Partial European Search Report mailed Jul. 27, 2006 in corresponding European Patent Application No. 04 719 295.0.

*Primary Examiner* — Milton I Cano
*Assistant Examiner* — Michael L Leonard

(57) ABSTRACT

A thermal transfer image-receiving polymeric sheet capable of recording thereon thermally transferred dye or ink images in a clear and sharp form. The image-receiving layer comprises at least one water dispersible aliphatic polyether-polyurethane resin and at least one water dispersible aliphatic polyester-polyurethane resin or a silica dispersion or an anionic aqueous emulsion of wax.

5 Claims, 1 Drawing Sheet

U.S. PATENT DOCUMENTS

| | | | | |
|---|---|---|---|---|
| 5,665,676 | A | 9/1997 | Nakamura et al. | 503/227 |
| 6,019,866 | A | 2/2000 | Onishi et al. | 156/311 |
| 6,110,865 | A | 8/2000 | Hayashi et al. | 503/227 |
| 6,136,440 | A | 10/2000 | Ito et al. | 428/411.1 |
| 6,362,273 | B1 | 3/2002 | Martin et al. | 524/591 |
| 6,375,941 | B1 | 4/2002 | Piot et al. | 424/70.7 |
| 6,420,310 | B1 | 7/2002 | Saito et al. | 503/227 |
| 6,455,136 | B1 | 9/2002 | Okajima et al. | 428/195 |
| 6,482,885 | B1 | 11/2002 | Müller et al. | 524/501 |
| 6,716,493 | B1 | 4/2004 | Notsu et al. | 428/32.12 |
| 6,770,373 | B1 * | 8/2004 | Kinoshita et al. | 428/423.1 |
| 2002/0176968 | A1 * | 11/2002 | Ozawa et al. | 428/195 |
| 2003/0158322 | A1 | 8/2003 | Rische et al. | 524/492 |

FOREIGN PATENT DOCUMENTS

| | | | |
|---|---|---|---|
| GB | EP 0358328 | * | 3/1990 |
| WO | 02/062894 | A1 | 8/2002 |
| WO | 2007/027710 | | 3/2007 |

* cited by examiner

THERMAL TRANSFER IMAGE RECEIVING SHEET AND METHOD

CROSS REFERENCE TO RELATED APPLICATIONS

This application claims priority to provisional patent Application No. 60/454,258, filed on Mar. 13, 2003, and to provisional patent Application No. 60/454,960, filed on Mar. 14, 2003, the disclosures of which are hereby incorporated by reference in their entirety.

BACKGROUND OF THE INVENTION

1. Field of the Invention

The present invention relates to a thermal transfer image-receiving sheet. More particularly, the present invention relates to a thermal transfer image-receiving polymeric sheet capable of recording thereon thermally transferred dye or ink images in a clear and sharp form.

2. Discussion of Related Art

In thermal transfer recording systems an ink ribbon is heated through a thermal head or by laser or the like in accordance with image information. The heating causes thermal melting, thermal diffusion or sublimation, by which a dye is transferred from the ink ribbon onto a printing sheet to form an image on the printing sheet.

The printing sheet generally is made up of a support film having a dye receiving layer coated thereon. The dye receiving layer is a layer that receives a dye or ink transferred thereto from the ink ribbon by heating and preserves an image formed from the dye. Typical dye receiving layers for polymeric substrates comprise at least one dye receptive resin dissolved in an organic solvent. Examples of such solvent borne resins include polyester, polycarbonate, polyvinyl chloride, vinyl chloride copolymers such as vinyl chloride-vinyl acetate copolymer, and thermoplastic resins such as polyurethane resin, polystyrene, acrylic-styrene (AS) resin, acrylonitrile-butadiene-styrene (ABS) resin, and the like.

It may be desirable to reduce or eliminate the use of volatile organic solvents in the process for manufacturing polymeric image receiving sheets. In particular, it may be desirable to employ an aqueous composition for producing an image receiving layer on a polyester substrate without compromising image clarity and durability.

SUMMARY OF THE INVENTION

According to an aspect of the invention, a printing sheet of the type that is used in a thermal transfer recording system is provided. The printing sheet includes a polymeric film support, and an image receiving layer formed on the film support. The image receiving layer may be formed from a coating of an aqueous coating composition. In one embodiment, the aqueous coating composition may include an aqueous dispersion of an aliphatic polyester-polyurethane, and an aqueous dispersion of an aliphatic polyether-polyurethane. In one embodiment, the aqueous coating composition may include an aqueous dispersion of an aliphatic polyether-polyurethane resin, a silica dispersion, and an anionic aqueous emulsion of wax. An aqueous crosslinking agent may be added to the aqueous coating composition, which may then be dried.

According to another aspect of the invention, a dye receiving coating composition is provided. In one embodiment, the dye receiving coating composition may include an aqueous dispersion of an aliphatic polyester-polyurethane, and an aqueous dispersion of an aliphatic polyether-polyurethane. In one embodiment, the dye receiving coating composition may include an aqueous dispersion of an aliphatic polyether-polyurethane resin, a silica dispersion, and an anionic aqueous emulsion of wax. An aqueous crosslinking agent may be added to the dye receiving coating composition.

According to yet another aspect of the invention, a method of preparing a thermal transfer image receiving sheet is provided. The method provides for coating a substrate sheet surface with the aqueous coating composition. And, drying the aqueous coating composition to form the thermal transfer image receiving sheet.

DETAILED DESCRIPTION OF EMBODIMENTS

Figure 1:
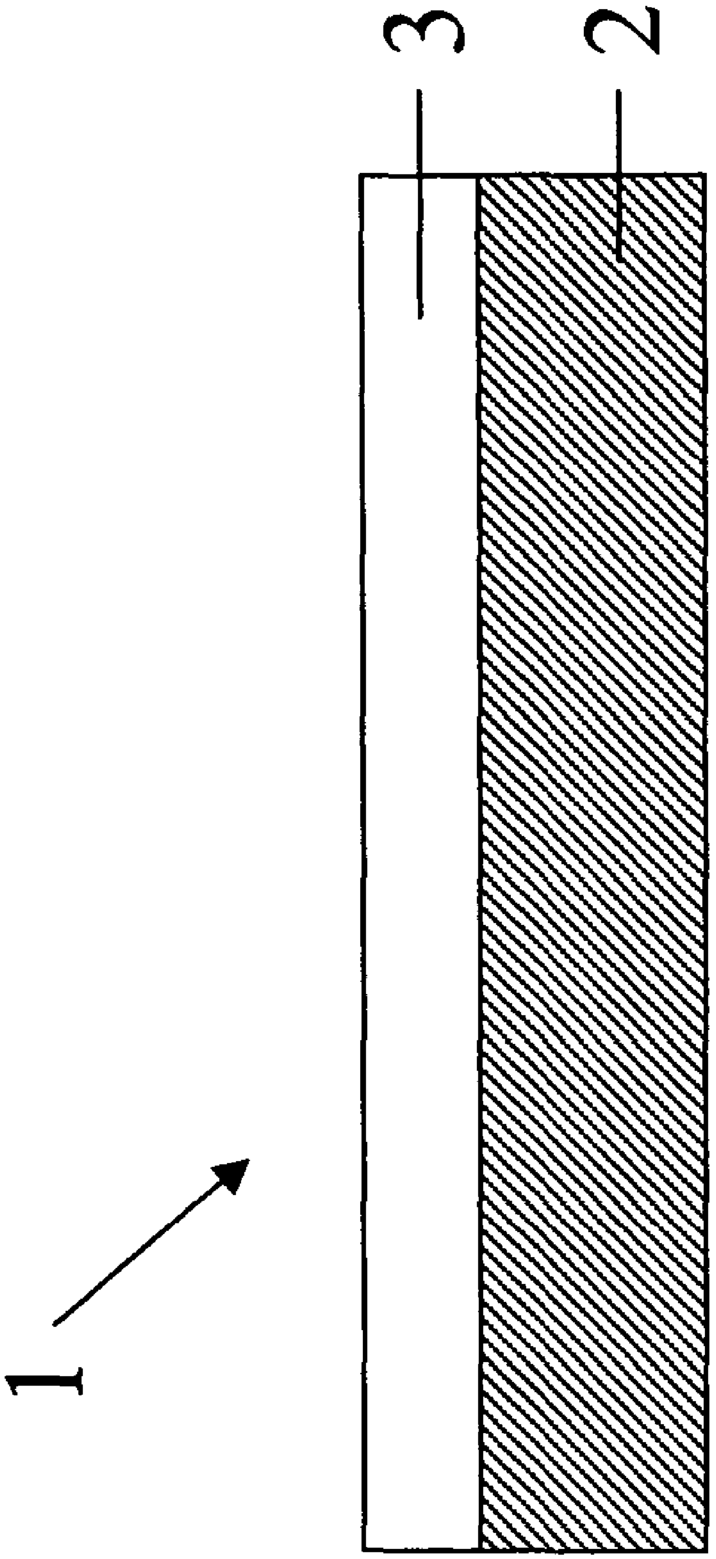
FIG. 1 is a schematic view illustrating a cross-section of a thermal transfer image receiving sheet according to the present invention.

The present invention is described in the following descriptions made with reference to FIG. 1. FIG. 1 is a schematic view of a cross section of one example of a thermal transfer image receiving sheet 1 according to the present invention. The thermal transfer image receiving sheet 1 may include a substrate sheet 2 and a dye receiving layer 3 disposed on one surface of the substrate sheet 2.

With reference to the substrate sheet 2, the substrate sheet 2 may be formed from sheet materials selected with reference to application specific criteria. Such criteria may include, for example, desired dimensions (height, length and thickness), surface texture, composition, flexibility, and other physical and economic attributes or properties. Suitable sheet materials may include, for example, synthetic papers such as polyolefin type, polystyrene type; wood free paper; art paper; coat paper; cast coat paper; wall paper; lining paper; cellulose fiber paper such as paperboard; various plastic films or sheets such as polyolefin, polyvinyl chloride, polyethylene terephthalate, polystyrene, polymethacrylate and polycarbonate.

In one embodiment, the substrate sheet 2 may be, or may include, a multilayer polymeric sheet. The multi-layers may be coextruded, or the multi-layers may be laminated together. In one embodiment, the substrate sheet 2 includes both some co-extruded multi-layers and some laminated multi-layers.

In addition, a white opaque film may be formed by adding a white pigment, or like fillers, to one or more of the aforementioned synthetic resins and used as the substrate sheet 2. In one embodiment, a foamed film is used as the substrate sheet 2. The foamed film which may be formed by a conventional foaming operation. In one embodiment, the substrate sheet 2 may be a laminated body formed by combining a plurality of the aforementioned single-layered sheets composed of the above listed materials. Examples of such a laminated body may include a laminated body of combined cellulose fiber paper with synthetic paper, and a laminated body of combined cellulose fiber paper with a plastic film or sheet.

The thickness of the substrate sheet 2, formed in the manner as mentioned above, may be determined with reference to application specific criteria. Such criteria may include the desired end use. In one embodiment, the sheet thickness is in a range of from about 10 microns or micrometers (μm) to about 300 μm. In one embodiment, the sheet thickness is in a range of from about 10 micrometers or microns (μm) to about 150 μm. In one embodiment, the sheet thickness is in a range of from about 150 micrometers or microns (μm) to about 300 μm.

A primer treatment or a corona discharging treatment may be used on the substrate sheet 2 to increase a bonding strength between the substrate sheet 2 and the dye receptor layer 3 to be formed on a surface of the substrate sheet 2.

An intermediate layer (not shown) may be provided between the dye receptor layer 3 and the substrate sheet 2 to impart preselected properties. Such properties may include an adhesion property, whiteness or brightness, cushioning property, antistatic property, shielding property, anti-curling property, and the like.

A back surface layer (not shown) may be provided onto a surface opposite the surface of the substrate sheet 2 to which the dye receiving layer 3 is formed. The back surface layer may impart preselected properties to the thermal transfer image receiving sheet 1. The properties may include, for example, an enhanced conveying fitness, an enhanced writing property, pollution resistance, anti-curling property, and the like. If desired, an antistatic layer (not shown) containing a commercially available antistatic agent may be provided on the dye receiving layer 2 or the back surface layer to improve the antistatic property of the thermal transfer image receiving sheet 1.

The dye receiving layer 2 may be a coating formed from an aqueous composition. In one embodiment, the aqueous coating composition includes at least one water dispersible aliphatic polyether-polyurethane resin and at least one water dispersible aliphatic polyester-polyurethane resin. The polyether-polyurethane resin and the polyester-polyurethane resin may be combined in the coating composition as separate aqueous dispersions. The dispersions will typically comprise colloidally dispersed particles of the polyurethane polymers. In one embodiment, the dye receiving coating composition has a weight ratio of the polyether-polyurethane resin to the polyester-polyurethane resin that is in a range of from about 1:1 to about 2:1, or in a range of from about 2:1 to about 3:1, based on the resin solids of the polyether-polyurethane and the polyester-polyurethane.

In one embodiment, the aqueous coating composition includes, an aqueous dispersion of an aliphatic polyether-polyurethane resin, a silica dispersion, and an anionic aqueous emulsion of wax.

In one embodiment, the polyester-polyurethane polymer is the reaction product of a predominantly aliphatic polyisocyanate component and a polyester polyol component. As used herein, the term "predominantly aliphatic" means that at least 70 weight percent of the polyisocyanate component is an aliphatic polyisocyanate, in which all of the isocyanate groups are directly bonded to aliphatic or cycloaliphatic groups, irrespective of whether aromatic groups are also present. More preferably, the amount of aliphatic polyisocyanate is at least 85 weight %, and most preferably, 100 weight %, of the polyisocyanate component. Examples of suitable aliphatic polyisocyanates include ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisocyanate, p-tetra-methylxylene diisocyanate (p-TMXDI) and its meta isomer (m-TMXDI), hydrogenated 2,4-toluene diisocyanate, and 1-isocyanto-1-methyl-3(4)-isocyanatomethyl cyclohexane (IMCI). Mixtures of aliphatic polyisocyanates can be used.

Polyester polyols that may be used in the polyester polyol component include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, glycerol, trimethylolpropane or pentaerythritol, or mixtures thereof. Also included are polycarboxylic acids, especially dicarboxylic acids, and ester-forming derivatives thereof. Examples include succinic, glutaric and adipic acids or their methyl esters, phthalic anhydride and dimethyl terephthalate. Polyesters obtained by the polymerisation of lactones, for example caprolactone, in conjunction with a polyol may also be used. Commercially available polyester-polyurethanes useful in the present invention include those sold under the trade names AVALURE UR-425, AVALURE UR-430, AVALURE UR-405 and AVALURE UR-410 by Goodrich Corporation (Charlotte, N.C.), and NEOREZ R-989 by NeoResins (Waalwijk, The Netherlands).

In one embodiment, the polyether-polyurethane polymer is the reaction product of a predominantly aliphatic polyisocyanate component and a polyether polyol component. Useful aliphatic polyisocyanates are described above. Suitable polyether polyols include products obtained by the polymerization of a cyclic oxide or by the addition of one or more such oxides to polyfunctional initiators. Such polymerized cyclic oxides include, for example, ethylene oxide, propylene oxide and tetrahydrofuran. Such polyfunctional initiators having oxides added include, for example, water, ethylene glycol, propylene glycol, diethylene glycol, cyclohexane dimethanol, glycerol, trimethylopropane, pentaerythritol and Bisphenols (such as A and F).

Suitable polyesters include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Commercially available polyether-polyurethanes useful in the present invention include those sold under the trade names SANCURE 878, AVALURE UR-450 and SANCURE 861 by Goodrich Corporation (Charlotte, N.C.), and NEOREZ R-551 by NeoResins (Waalwijk, The Netherlands).

The dye receiving layer 3 may include a water dispersible crosslinker. Suitable water-dispersible polyfunctional chemically activatable crosslinking agents are commercially available. These crosslinking agents include dispersible formulations of polyfunctional aziridines, isocyanates, melamine resins, epoxies, oxazolines, carbodiimides and other polyfunctional crosslinkers. In one embodiment, the crosslinking agents are added at an amount in a range of from about 0.1 parts to about 10 parts based on 100 parts total solids. In one embodiment, the crosslinking agents are added at an amount in a range of from about 0.2 parts to about 5 parts based on 100 parts total solids. Adding crosslinking agents to the polyurethane dispersion composition may form an interpenetrating or interconnected network having crosslinked matrixes is formed which link the blended polymers with covalent and/or non-covalent linkages.

The dye receiving layer 3, to be formed as mentioned above, may have a predetermined thickness based on factors such as viscosity; application type, amount and method; desired end use; and the like. In one embodiment, the thickness may be in a range of about 1 μm to about 50 μm. In one embodiment, the thickness may be in a range of from about 1 μm to about 25 μm, and in one embodiment in a range of from about 25 μm to about 50 μm.

The image receiving sheet 1 may be applied to applications where thermal transfer printing can be conducted. Suitable applications include image receiving sheets in a flat sheet or roll form, cards and sheets for preparing transparent originals. Selection of the parameters defining the substrate sheet 2 may aid in tailoring the image receiving sheet 1 to the desired application.

EXAMPLES

The following examples are intended only to illustrate methods and embodiments in accordance with the invention, and as such should not be construed as imposing limitations upon the claims. Unless specified otherwise, all ingredients are commercially available from such common chemical suppliers as Sigma Aldrich, Inc. (St. Louis, Mo.) and/or Fisher Scientific International, Inc. (Hanover Park, Ill.).

Example 1

A coating composition comprising the ingredients listed in Table 1 is prepared as follows. Equal amounts by weight of water and of the blend of polyurethane dispersions were added together, i.e., 100 parts water to 100 parts dispersion.

The coating composition was then coated onto a semi-clear, biaxially oriented polyethylene terephthalate (PET) substrate web. The web may have a thickness of about 25 micrometers. The coating was dried at a temperature of 90 degrees Celsius and a line speed of 120 meters/minute to form an image receiving layer. The dry coat weight of the image receiving layer was in a range of from about 0.8 g/m$^2$ to about 1 g/m$^2$.

The coating composition of Example 1 was also coated onto a matte chrome, biaxially oriented PET substrate having a thickness of 50 microns, and onto a white, biaxially oriented PET substrate having a thickness of 50 microns.

TABLE 1

Ingredient list for Example 1.

| Ingredient | % wt. |
|---|---|
| Polyurethane dispersion (NEOREZ R-551: aliphatic polyether urethane dispersion, 35.5% solids) | 70 |
| Polyurethane dispersion (NEOREZ R-989: aliphatic polyester urethane dispersion, 40% solids) | 29.9 |
| Crosslinker (Crosslinker CX-100: polyfunctional aziridine crosslinker) | 0.1 |

Example 2

A coating composition comprising the ingredients listed in Table 2 is prepared as follows. The ingredients are mixed until substantially uniform and coated onto a substrate web in substantially the same manner as in Example 1. The coated substrate web of PET is suitable for laser printing, and with UV curable inks.

TABLE 2

Ingredient list for Example 2.

| Ingredient | % wt. |
|---|---|
| Polyurethane dispersion (NEOREZ R-563: aliphatic polyether urethane dispersion, 35.5% solids) | 48.4 |
| Silica dispersion (Polymer Product - FP 44) | 0.5 |
| Anionic aqueous emulsion of combined waxes (AQUACER 537: amino alcohol) | 1.0 |
| Crosslinker (Crosslinker CX-100: polyfunctional aziridine crosslinker) | 0.1 |
| Water | 50.0 |

AQUACER 537, which is commercially available from Byk-Cera, which is a subsidiary of Byk-Chemie a division of ALTANA AG (Bad Homburg, Germany) is 2-diethylamino-ethanol.

While the invention has been explained in relation to embodiments, it is to be understood that various modifications thereof will become apparent to those skilled in the art upon reading the specification. Therefore, it is to be understood that the invention disclosed herein is intended to cover such modifications as fall within the scope of the appended claims, and to cover insubstantial variations thereof.

What is claimed is:

1. An aqueous dye receiving coating composition comprising a blend of:

(a) a first solvent free aqueous dispersion of aliphatic poly-etherpolyurethane resin; and (b) a second solvent free aqueous dispersion of aliphatic polyester-polyurethane resin, wherein the weight ratio of resin (a) to resin (b) is in the range of 1:1 to 3:1, based on the resin solids of (a) and (b).

2. The dye receiving coating composition of claim 1 further comprising a multifunctional crosslinking agent.

3. The dye receiving coating composition of claim 1 wherein the coating composition is free of organic solvent.

4. The dye receiving coating composition of claim 1 wherein the aliphatic polyether-polyurethane resin (a) comprises the reaction product of an aliphatic polyisocyanate component and a polyether polyol component.

5. The dye receiving coating composition of claim 1 wherein the aliphatic polyester-polyurethane resin (b) comprises the reaction product of an aliphatic polyisocyanate component and a polyester polyol component.

* * * * *